United States Patent Office 3,262,794
Patented July 26, 1966

3,262,794
BASIC FUSED REFRACTORIES
Ben Davies, Ernest P. Weaver, and Peter H. Havranek, Pittsburgh, Pa., assignors to Harbison-Walker Refractories Company, Pittsburgh, Pa., a corporation of Pennsylvania
Filed June 2, 1964, Ser. No. 372,050
9 Claims. (Cl. 106—58)

This invention relates to furnace structure for the oxygen steelmaking process, and refractory material for construction of the lining thereof. More particularly, this invention relates to improved refractory fusion for fabrication of shapes for the working lining of oxygen steeelmaking vessels.

Variants of the oxygen blowing process, which was first developed about ten years ago, have been referred to as the LD process, Kaldo process, rotor process, oxygen converter process, or, simply, as oxygen blowing. A basic slag is used requiring the use of basic refractories to resist corrosion.

The principal basic refractories of industry include products of dead burned magnesite or magnesia (we use these terms interchangeably in this specification, but intend to describe a hard burned magnesite material of well-developed periclase crystal structure) or dead burned dolomite ($C_aO \cdot MgO$). (To call this material dolomite is really a misnomer, since, after dead burning, it is, in essence, an intimate mixture of crystalline periclase and calcia.) Refractories made of hard burned lime or calcia have also been proposed, because of the extreme refractoriness of this material, but the tendency of lime to hydrate upon exposure to moisture in the air has limited its use. Lime refractories are also vulnerable to attack by ferruginous slags.

Research has persisted to develop a better basic refractory from the conventional basic refractories of industry, to serve as the working lining of the vessel used in the oxygen blowing process. The majority of early operations where steel was made by the oxygen blowing or converter process used unburned brick of dead burned dolomite compositions bonded with a pitch or tar to form the lining which contacted the molten metal. As is well known in the art, dead burned dolomite hydrates almost as readily as lime in the presence of moisture. The pitch or tar used to bond the dolomite, therefore, serves at least two functions:

(1) Provides a bond for the refractory particles, and also (2) Aids in inhibiting the hydration of the dead burned dolomite by forming a moisture resistant coating on the particles.

To further improve the hydration resistance of this type of bonded brick, blends of dead burned dolomite and magnesia have been used as have various types of so-called stabilized dolomites, which are made by including various fluxes such as iron oxide, silica, etc. before burning the refractory grain. Dead burned magnesia alone and in combination with hard burned lime or dolomite has also seen some use.

With the advent of much larger converter vessels, there has been an increasing need for a basic refractory of far more high temperature strength than one can obtain with the tar bonded varieties. The result has been an increased interest in the class of fired or ceramically bonded basic refractory shapes. These shapes are made from substantially the same kinds of basic refractory materials as the tar bonded ones, but the shapes are fired or subjected to elevated burning temperatures to obtain a ceramic or sintered bond between the particulate material from which the shape is fabricated. The present invention relates particularly to this class of ceramically bonded basic refractory shapes.

In both the tar bonded and ceramically bonded shapes, the strength of the bond is probably one of the most important properties. In order to obtain a shape which is easily handled and stands up in service without spalling, corroding, etc., the bond must be strong and relatively stable. For certain uses, high density and low porosity are equally important properties. These latter properties are desirable in a shape to resist penetration by corrosive metallurgical slags and by fumes which accelerate the destruction of the shapes in service.

Even though the ceramic bond through the particulate material of a shape ordinarily provides adequate strength, it is still desirable to treat the shape with a nonaqueous cokable carbonaceous material. This latter language is deemed generally descriptive of the art-recognized bonding and impregnating agents; namely, pitches, tars, and the like, which are used to bond and/or impregnate basic refractories. A good description of these types of material will be found, for example, in the United Satates patent to Davies and Weaver, No. 3,070,449, which issued Christmas day of 1962.

An example of a good tar impregnated dead burned magnesite refractory of the class to which the present invention belongs is one made according to the teachings of the United States patent to Davies and Weaver, No. 3,106,475, which issued October 8, 1963. The brick of this patent are particularly adapted to manufacture by conventional techniques using commercially available materials. One of their outstanding properties is resistance to impact abrasion and spalling. The brick are further characterized by good compressive strength at elevated temperatures. However, in some service installations, where ceramically bonded brick are subjected to tensile stress due to expansion and the like, the brick of Patent No. 3,106,475, do not have as much resistance as might have been desired. In seeking to provide a better brick, we invented the brick of our copending application Serial No. 254,013 (now United States Patent No. 3,141,790), filed January 25, 1963, entitled "Oxygen Steelmaking," and owned by the same assignee as the present invention. The brick of our copending application, just identified, provides greatly improved resistance to tensile stresses in service. Recently, vessels having working linings fabricated entirely of the brick of our copending application have set world records for steel production on a single lining.

In one respect, the invention of our copending application Serial No. 254,013, was predicated upon the discovery that controlled adulteration of very high purity dead burned magnesia grain (usually synthetic and containing 97+% MgO, by weight and on an oxide basis), and use of this grain in the manufacture of a ceramically bonded shape with subsequent tar impregnation thereof, provided excellent service in an oxygen converter vessel. The $R_2O_3$ content of the grain of the brick of application Ser. No. 254,013 was found to be very critical. We found that it had to be maintained below about 1%, by weight. As known to those in the art, "$R_2O_3$" refers to the oxides $Cr_2O_3$, $Fe_2O_3$, and $Al_2O_3$. Our so-called adulterating ingredients were stated to be lime and silica. The silica content preferably was maintained between about 0.8% and about 1% of the grain and shapes, with at least 3.0 but no more than about 4.0 times as much calcia as silica, expressed as CaO and $SiO_2$.

However, even though the brick of our copending application Ser. No. 254,013 have been exceptional in service, the matrix thereof still tends to be attacked slowly by oxygen converter slags. We have discovered that certain trace elements present in some of the slags (chemistry of slags varies somewhat from one steelmaking shop to the next), such as alumina and titania, or additions of fluxes such as fluorspar, are particularly troublesome. Accordingly, it is a primary object of this invention to provide an improved ceramically bonded, tar impregnated, basic refractory shape better able to resist corrosive attack and destruction by oxygen converter slags.

It is another object of the invention to provide an improved ceramically bonded magnesite brick. It is another object of the invention to provide an improved tar impregnated ceramically bonded magnesite brick. It is yet another object of the invention to provide an improved synthetic basic refractory material for manufacture of brick and the like.

It is still a further object of the invention to provide an improved basic refractory which, in combination with a basic oxygen furnace vessel as the working lining thereof, is able to extend furnace life by ability to longer resist attack and destruction by oxygen converter slags.

In one aspect, this invention is predicated upon the discovery that controlled adulteration of very high purity dead burned magnesite material with subsequent electrical fusion or melting thereof produces a grain eminently suited for the fabrication of ceramically bonded magnesite brick. These brick, with or without subsequent tar impregnation thereof, provide superior service in contact with the slags of the oxygen converter process. The magnesite grain must have no more than about 1%, by weight, of the $R_2O_3$ oxides $Cr_2O_3$, $Al_2O_3$, and $Fe_2O_3$. The silica content, expressed as $SiO_2$, is no more than about 1%, but it is present together with lime. The weight ratio of lime to silica is between about 3 to 1 and 4 to 1. The remainder of the brick, on an oxide basis, analyzes MgO. The MgO content, thus, falls in the range about 96 to 97%. More precisely, the MgO content is from at least about 95% to a little less than 96.8%.

A better understanding and other features and advantages of our invention will readily become apparent to those skilled in the metallurgical and refractory arts by a reading of the following detailed description with reference to specific examples and to the drawings. In these drawings.

Figure 3:
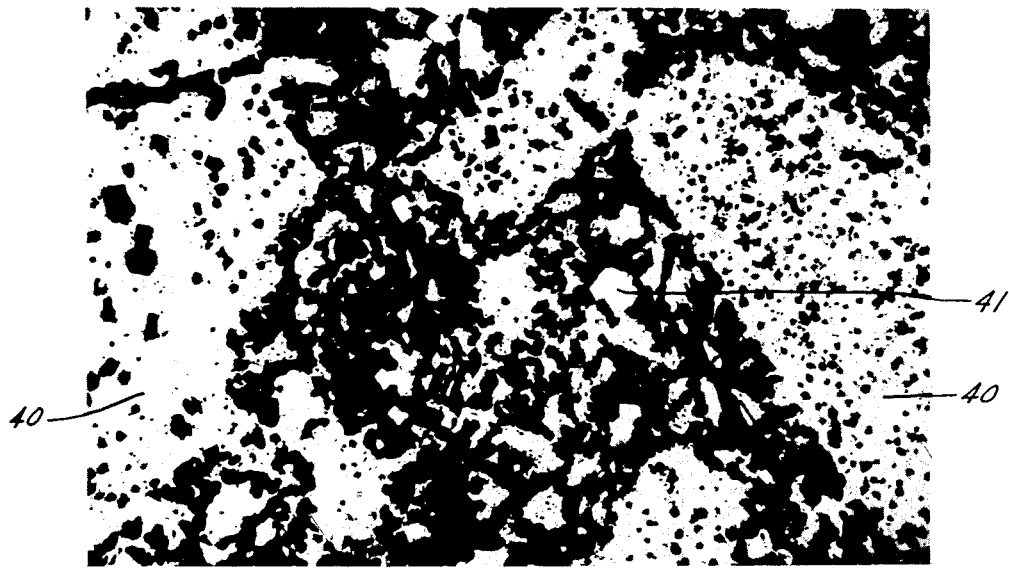
Figure 4:
Figure 5:
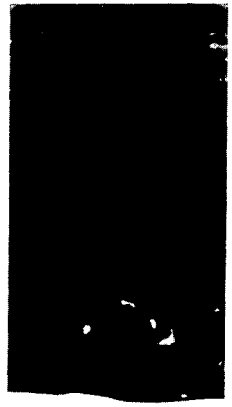
Figure 6:

FIG. 3 is a photomigraph (75×) of an area of a brick made according to the teachings of this invention, which emphasizes a unique characteristic of the groundmass or matrix thereof; and FIGS. 4, 5 and 6 are photographs of comparative samples after subjection to the corrosive effects of a synthetic oxygen converter slag. FIG. 4 is a brick fabricated entirely of the grain of FIG. 1. FIG. 5 is of a brick in which the grain of FIG. 1 constitutes the finer fraction of the batch from which the brick was made. FIG. 6 is of a brick made according to our copending application Serial No. 254,013.

All refractories that are used in the construction of a high temperature steelmaking furnace are eventually consumed. Their value is not judged by the fact that they were consumed but, rather, on how low was the rate of this consumption. The reasons that brick wear out in furnaces are many and varied. In basic oxygen furnaces, it appears the principal modes of wear are abrasion from fast moving dust-laden gases, and by the solubility of the brick in the slag.

The abrasion from dust in the furnace can be substantially reduced, if the furnace lining is made of brick that have high strength at steelmaking temperatures. The problem of slag resistance in brick for basic oxygen furnaces is basically a problem of controlling the kinetics of the reaction between refractory and slag. A study of this problem had shown that the matrix or fine portion of the brick, which has a large surface area, is most vulnerable to attack by the molten slag. When the slag attacks and consumes this portion of the brick, the particles of the coarser fractions are easily washed away. Therefore, the key to the problem of making brick slag resistant, is actually to make the matrix or fines highly resistant to attack by the slag.

This invention deals with changing the physical nature of these fines, so their chemical potential for reaction with the slag is reduced. We have found that by first melting all or a portion of the material which is to be used in the manufacture of the refractory, and then cooling so that large massive crystals develop, the surface energy of this refractory material is greatly reduced. Refractory brick can be made wholly from this fused, highly crystalline material, or the coarse fraction can be made from refractory material that has been hard burned, but not melted, and the fine portion will be composed of the fused material. Brick of this type, that are burned to form a ceramic bond, have a matrix that has a minimum driving force for reaction with the slag. By proper chemical control and tar impregnation, refractories of the highest resistance to slag attack can be made.

Of course, workers in this and related ceramic fields have long recognized that lime and silica could be balanced in a basic refractory, i.e. one fabricated of magnesite or dolomite, to good advantage. The United States patent to Pitt, No. 2,245,297; to McCaughey et al., No. 1,965,605; to Lee, Nos. 2,089,970 and 2,229,297, and others, are indicative or prior work in this area.

The basic goal of these workers appears to have been stabilization of the materials with which they worked (especially stabilization of calcia). By stabilization, we mean to infer reduction of the susceptbility of basic materials to hydration.

Figure 2:
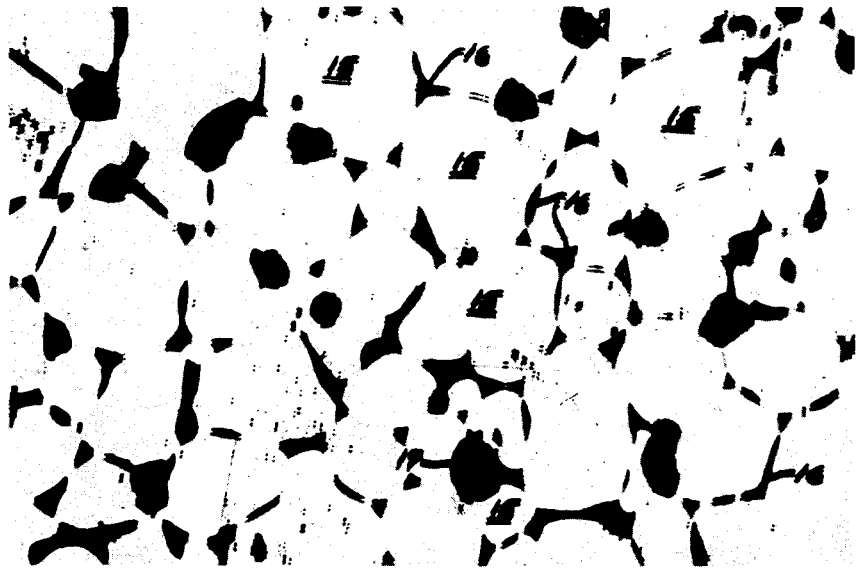
FIG. 2 is a photomigraph (360×) representative of both the grain and the brick which were made according to our copending application Serial No. 254,013.

In FIG. 2, we show a photomicrograph (360× magnification) indicative of the refractory of our copending application Serial No. 254,013, and in which the large white areas 15 are periclase grains. Silicates 16 are present as thin discontinuous films, commonly squeezed into triangles at crystal corners. At larger magnification, we can discern periclase crystal boundaries over the extent of the large periclase particles 15, which crystals or crystallities are extensively directly attached to each other and to adjacent larger periclase particles. The silicate deposits 16 were identified by X-ray analysis to be, in large part, and in some instances, substantially all tricalcium silicate. The irregular areas 17 are pores.

The novel microstructure, shown in FIG. 2, came about after our realization that, to develop the best tensile strength, one had to obtain direct attachment of periclase crystal agglomerate to periclase crystal agglomerate substantially without intervening films of silicates. We have now discovered a manner in which to practically eliminate filming by silicates. We do this by fusing material of the general chemical composition of our copending application in an electric furnace.

Figure 1:
FIG. 1 is a photomicrograph (360×) of a portion of a grain used to make a ceramically bonded brick according to this invention.

As shown in FIG. 1, which is at the same magnification as FIG. 2 (360×), periclase deposits or particles 20 are substantially larger than periclase crystal agglomerates 15 in FIG. 1 and, in fact, almost appear monolith-like because of the frequent bridging between adjacent particles 20, as at 21. Petrographically, they are characterized by massive periclase crystals. They are macro crystalline. Silicates 22 appeared as discontinuous deposits along the edges of some of the particles 20, and as round to ovoid and lenticular pools within the deposits themselves. While the FIG. 1 showing is believed representative of material according to this invention, the individual periclase grain or crystal or deposit size was found to be variable. The size ranged from massive single crystal coarse particles or deposits as in the drawings down to some agglomerates, in which the constituent crystallites can be seen only at high magnifications.

We prepared a magnesite of a mixture of high purity commercially available magnesia, lime hydrate of at least 99% purity and (since it did not naturally occur) of silica of at least about 99% $SiO_2$, on an oxide basis. The commercially available magnesia we used is identified in Table I.

Table I

| Magnesia AA: | Percent |
|---|---|
| $SiO_2$ | 0.9 |
| $Al_2O_3$ | 0.4 |
| $Fe_2O_3$ | 0.3 |
| CaO | 1.1 |
| MgO | 97.3 |
| Ratio $CaO/SiO_2$ | 1.22/1 |

All parts by weight and on the basis of an oxide analysis.

The mixture of magnesia AA and calcia and silica as necessary was caustic calcined to provide magnesia BB, an analysis of which was typically as follows:

Table II

| Magnesia BB: | Percent |
|---|---|
| MgO | 96.3 |
| $SiO_2$ | 0.8 |
| CaO | 2.9 |
| $Fe_2O_3$ | 0.3 |
| $Al_2O_3$ | 0.4 |
| Ratio $CaO/SiO_2$ | 3.63/1 |

The caustic calcined mixture with all free and substantially all chemically combined water removed, were formed into briquettes and fired in a shaft kiln using substantially the same techniques as disclosed according to Snyder, U.S. Patent No. 3,060,000. The resulting briquettes were melted in an electric furnace and allowed to resolidify. The solidified mass was broken into fist size lumps. The resulting roughly broken material was crushed to make a size graded brick batch to make test brick. All test brick were made in substantially the same manner. This included pressing into brick on a brick press as about 8000 p.s.i., and burning to cone 30 (about 2900 to 3000° F.). About 5% of a 50 to 50 (weight) water and lignin mixture was used as a tempering agent for the brick batch. The overall size grading of all test brick as reported in Table IV and V was typically as follows, although, of course, some variation was had from batch to batch, due to grain breakage in handling and the like.

Table III

| | Percent |
|---|---|
| —4 on 10 mesh | 30 |
| —10 on 28 mesh | 35 |
| —65 mesh to ball mill fines | 35 |

While this is a preferred sizing, the sizing is variable within limits, i.e. the —65 mesh fraction can constitute from about 20 to 40% of the batch. Also, some particles (up to about 5%) can be as coarse as ½.

The following table, Table IV, sets forth the results of testing of the comparative brick.

As indicated by Table IV, excellent strength was had at room temperature and at 2300° F., as determined by testing for modulus of rupture. Density and porosity were also quite good. Of special interest is Mix C, in which up to 65% was of the nonfused material, but it still provided very good strength, low porosity, and good density.

Table IV, however, does not tell the whole story. The nonfused materials that can be used in the coarse fraction according to this invention include dead burned magnesia, dead burned dolomite, and hard burned lime. In comparative tests, in which the brick of Table IV were subjected to synthetically fabricated oxygen converter slag and compared with brick of the type manufactured according to our application Serial No. 254,013, completely unexpected results were obtained. The results of this slag test are set forth in Table V. The brick designated Mix D is according to the copending application. It was made entirely of the unfused magnesia BB. Forming and firing were the same as for Mixes A, B, and C.

Table V

| Drip slag test at 2,900° F. using 1,200 gms. synthetic oxygen converter slag. | A | B | C | D |
|---|---|---|---|---|
| Volume of Brick eroded, cc.: | | | | |
| Basic Slag I | 15 | 13 | 10–14 | 21 |
| Basic Slag II | 9 | | 16 | 42 |

These slags had increased amounts of particularly corrosive constituents as compared to actual basic oxygen converter slags. The slag I had about 2% of $Al_2O_3$ and 2% of $TiO_2$ added, and the slag II had about 4% $CaF_2$ added.

FIG. 4 shows the appearance of the brick made of Mix A after the test. FIG. 5 is indicative of the brick of Mix C and FIG. 6 is indicative of the brick of Mix D.

Further testing established that our special fused material is especially effective only in burned or ceramically bonded brick. (An unburned brick using the fused fines (35% of the batch), while the coarse fraction was of a conventional magnesite grain, had a 64 cc. erosion when subjected to the slag I of Table V.) The Table V showing of a mere 10 to 15 cc. slag I erosion was considered excellent. Ranges of from 21 to about 27 cc. have been learned to be expected for the brick of our copending application, when subjected to the very corrosive synthetic slag I of our tests. By way of comparison, as high as 40 cc. erosion is normally expected for tar bonded brick when subjected to ordinary oxygen converter early slag.

In our extensive work in the field of this invention, we sometimes find that if all of the other factors are suitably confined, control of the ratio of CaO to $SiO_2$ in an adaptable device for maintaining product quality. At the same time, when we so operate that the $CaO/SiO_2$ ratio is between 3/1 and 4/1, we are, in effect, making sure that the principal nonmagnesia crystalline ingredient

Table IV

| Magnesite | Fused Grain BB | | 35%, By Weight, Fused Grain BB As The Ball Mill Fine Fraction, Remainder Dead Burned Grain BB. |
|---|---|---|---|
| Brick Mixes: | A | B | C |
| Bulk Density, p.c.f. | 191 | 191 | 185 |
| Modulus of Rupture, p.s.i.: | | | |
| At room temperature | 2,630 | 2,640 | 3,080 |
| At 2,300° F | 1,480 | 1,320 | 1,370 |
| Apparent Porosity, Percent | 16.0 | 16.4 | 16.7 |
| Apparent Specific Gravity | 3.58 | 3.57 | 3.50 | is tricalcium silicate (3CaO·SiO$_2$). This may at first appear puzzling since, on a molecular basis, this mineral contains CaO and SiO$_2$ in the ratio of only 2.8/1. However, the following may be helpful.

If a magnesite should be made available, in which all of the CaO and SiO$_2$ were present as dicalcium silicate (2CaO·SiO$_2$), the CaO/SiO$_2$ ratio would be 1.87/1, which is calculated from the molecular weights; if present solely as tricalcium silicate (3CaO·SiO$_2$), the CaO/SiO$_2$ ratio would be 2.8/1; if present solely as wollastonite (CaO·SiO$_2$), the CaO/SiO$_2$ ratio would be 0.93. If a magnesite should contain more CaO than the 2.8/1 ratio of tricalcium silicate, the excess CaO would necessarily be present as some mineral other than calcium silicates, since there is no calcium silicate more calcareous than tricalcium silicate. Such excess CaO is thought of as existing as ferrites, or aluminates (if the requisite Fe$_2$O$_3$ and Al$_2$O$_3$ are present) or as free lime.

The foregoing discussion of experimental data demonstrates the superiority in physical properties and, in particular, the superiority in slag resistance and in hot strength as measured by modulus of rupture at 2300° F., for brick made in accordance with our invention. We have also demonstrated in the laboratory that they exhibit adequate resistance to thermal shock, as evidenced by 0.0% spalling loss when subjected to ASTM C–122 thermal shock tests. The combination of thermal shock resistance and hot strength together with their excellent slag resistance renders them particularly suitable in locations in an oxygen process vessel where mechanical wear and rapid temperature changes are present, namely, in the cone and slag splash zones of oxygen converter vessels.

Of course, the brick of this invention, preferably, are tar impregnated for use in an oxygen vessel. We suggest between 4 and 10%, by weight, of tar in the brick as being most suitable. Between 6 and 8% tar is best. Brick can be impregnated by immersion in the selected carbonaceous material, generally preheated to about 400° F.

The heated and liquified carbonaceous material easily penetrates throughout the brick and, in cross section, the brick show remarkably uniform distribution of the carbonaceous material, including a thin layer completely about exterior surfaces. Commercially available tar or pitch of petroleum or coal base can be used for impregnation. Generally, we suggest a coal based pitch, having a softening point on the order of about 150° F.

While the fusion of this invention has been discussed above with reference to our novel burned brick, it has other uses. For example, in the manufacture of burned chrome-magnesia and magnesia-chrome brick.

We believe FIG. 3 nicely demonstrates a possible reason for the especially good resistance to corrosion, which is shown by a brick of our invention. FIG. 3 is considered fairly representative of what our brick looked like under the microscope under lower magnification (75× magnification). In FIG. 3, the grains 40 are the coarser material, whereas, the small grains 41, dispersed through the darker background, are part of the matrix. These fine particles 41 appear to be substantially homogeneous and monolith-like. No crystallite boundaries are easily discerned. We believe such particles as 41 are fragments of single crystals. This being the case, there is no silicate filming on these particles. We believe this greatly assists the matrix in resisting corrosive attack by the early and late oxygen converter slags.

Unless otherwise stated, all chemical analyses are on the basis of an oxide analysis, in conformity with the common practice of reporting the chemical analyses of refractory materials. All size grading is according to the Tyler mesh series. All parts and percentages are by weight. The chemical analyses of raw materials, which are reported, should be considered typical. However, the lime, silica, and R$_2$O$_3$ content, reported in the various analyses, should be considered accurate to the first decimal place.

Having thus described the invention in detail and with sufficient particularity as to enable those skilled in the art to practice, what is desired to have protected by Letters Patent is set forth in the following claims.

We claim:

1. A fusion of a batch consisting essentially of from about 0.8 to no more than about 1% SiO$_2$, CaO in an amount sufficient to obtain a CaO to SiO$_2$ weight ratio between about 3 to 1 and about 4 to 1, the remainder consisting essentially of MgO and materials of the group Fe$_2$O$_3$, Cr$_2$O$_3$, and Al$_2$O$_3$, said latter materials constituting less than about 1% of the total weight of the fusion, the MgO present predominantly as massive crystals of periclase with the SiO$_2$ and CaO being present as discontinuous deposits along the edges of some crystals and as round to ovoid and lenticular pools within the crystals.

2. A fusion made from a batch consisting essentially of 96 to about 97% MgO, CaO and SiO$_2$ in a weight ratio between about 3 to 1 and about 4 to 1, and materials of the group Cr$_2$O$_3$, Al$_2$O$_3$, and Fe$_2$O$_3$, in an amount not exceeding about 1% thereof.

3. Ceramically bonded basic refractory shapes suitable for use in metallurgical vessels, said shapes made substantially entirely of fused material, said shapes, by weight and on the basis of an oxide analysis, consisting essentially of from about 96 to about 97% MgO, there being CaO and SiO$_2$ in a weight ratio between about 3 to 1 and about 4 to 1, and materials of the group Cr$_2$O$_3$, Al$_2$O$_3$, and Fe$_2$O$_3$, in an amount not exceeding 1%.

4. Ceramically bonded basic refractory shapes suitable for use in metallurgical vessels, said shapes made from a size graded basic refractory batch which includes an about −3 +65 mesh coarser fraction and a finer −65 mesh to ball mill fines fraction, the finer fraction being substantially entirely of a fusion, said fusion, by weight and on the basis of an oxide analysis, consisting essentially of from about 96 to about 97% MgO, there being CaO and SiO$_2$ in a weight ratio between about 3 to 1 and about 4 to 1, and material of the group Cr$_2$O$_3$, Al$_2$O$_3$, and Fe$_2$O$_3$ in an amount not exceeding about 1%, the coarser fraction being substantially entirely of material selected from the group consisting essentially of said fusion, dead burned magnesite, dead burned dolomite and hard burned lime.

5. The ceramically bonded shapes of claim 4, tar impregnated throughout with a selected, nonaqueous, cokable, carbonaceous material selected from the group consisting essentially of tar and pitch.

6. Tar-impregnated ceramically bonded basic refractory shapes having superior resistance to attack by slags including titania, alumina, and fluorspar, said shapes made from a batch of size-graded melted and resolidified basic refractory material which, by weight on the basis of an oxide analysis, consists essentially of from 0.8 to no more than about 1.0% SiO$_2$, CaO in an amount sufficient to obtain a CaO:SiO$_2$ weight ratio between about 3:1 and about 4:1, the remainder consisting essentially of MgO and materials of the group Fe$_2$O$_3$, Cr$_2$O$_3$, and Al$_2$O$_3$, said latter materials constituting less than about 1.0% of the total weight of the batch.

7. Ceramically bonded basic refractory shapes having superior resistance to attack by slags including titania, alumina, and fluorspar, said shapes made from a batch of size-graded melted and resolidified basic refractory material which, by weight on the basis of an oxide analysis, consists essentially of from 0.8 to no more than about 1.0% SiO$_2$, CaO in an amount sufficient to obtain a CaO:SiO$_2$ weight ratio between about 3:1 and about 4:1, the remainder consisting essentially of MgO and materials of the group Fe$_2$O$_3$, Cr$_2$O$_3$, and Al$_2$O$_3$, said latter materials constituting less than about 1.0% of the total weight of the batch.

8. Ceramically bonded basic refractory shapes suitable for use in metallurgical vessels, said shapes made from a size-graded basic refractory batch which includes an about −3 +65 mesh coarser fraction and a finer −65 mesh to ball mill fines fraction, the finer fraction being substantially entirely of a fusion, said fusion, by weight on an oxide basis, consisting essentially of from 0.8 to no more than about 1% $SiO_2$, CaO in an amount sufficient to obtain a $CaO:SiO_2$ weight ratio between about 3:1 and about 4:1, the remainder consisting essentially of MgO and materials of the group $Fe_2O_3$, $Cr_2O_3$, and $Al_2O_3$, the materials of said group $Fe_2O_3$, $Cr_2O_3$, and $Al_2O_3$ constituting less than about 1% of the total weight of the fusion, the coarser fraction being substantially entirely of material selected from the group, consisting essentially of said fusion, dead burned magnesite, dead burned dolomite, and lime.

9. The ceramically bonded shapes of claim 8, tar-impregnated throughout with a selected nonaqueous cokable carbonaceous material selected from the group consisting essentially of tar and pitch.

References Cited by the Examiner

UNITED STATES PATENTS

| | | | |
|---|---|---|---|
| 2,952,605 | 9/1960 | De Varda | 106—58 |
| 3,030,228 | 4/1962 | Hernandez et al. | 106—58 |
| 3,141,790 | 7/1964 | Davies et al. | 106—58 |

TOBIAS E. LEVOW, *Primary Examiner.*

J. POER, *Assistant Examiner.*